United States Patent Office 3,005,776
Patented Oct. 24, 1961

3,005,776
HYDRAULIC FLUID COMPOSITION
Theodore W. Langer, deceased, late of Buffalo, N.Y., by Shirley A. Langer, administrator, New Haven, Conn., and Walter J. Ziemba, Buffalo, N.Y., assignors to Union Carbide Corporation, a corporation of New York
No Drawing. Filed Dec. 31, 1959, Ser. No. 863,371
3 Claims. (Cl. 252—77)

This invention relates to hydraulic fluid compositions and more particularly to aqueous hydraulic fluids which contain certain high molecular weight thickening agents.

A variety of hydraulic fluid compositions have been suggested for use in systems adapted for the transfer of mechanical energy, typical of which are hydraulic brakes, recoil devices, shock absorbers, and the like. Among the hydraulic fluids which are already known in the art are the safety fluids referred to as "Hydrolubes," aqueous-based fluids which contain a freezing point depressant, water and a polymeric thickener as major constituents with small amounts of additive agents incorporated therein to provide a balanced formulation. Fluids of this type are useful as fire-resistant hydraulic fluids for industrial equipment and have found particular application in die-casting machines, ingot manipulators, furnace controls, electric welders and presses. Although hydraulic compositions of this type possess one or more desired characteristics of viscosity-temperature variation, volatility, or pour point, their use has been handicapped to some extent inasmuch as a wide range of suitable properties can not be maintained. For example, organic polymeric thickeners which are used to impart a high viscosity to the fluids frequently suffer the disadvantage of shear breakdown due to mechanical functioning of the hydraulic system. Shear breakdown, as indicated by a viscosity drop in the fluid, can effect a pressure drop and loss of delivery in the circuitry system which in turn can seriously impair the intended service application and possibly result in damage to property.

The present invention is based on the discovery that polyoxyalkylene addition products of ethylenediamine which have a molecular weight of at least 20,000 are highly efficient as polymeric thickening agents for aqueous-based hydraulic fluid compositions. Although it is known that polymeric thickeners having molecular weights greater than 15,000 are increasingly subject to shear breakdown, the high molecular thickening agents of the invention unexpectedly have been found to provide aqueous-based hydraulic fluids which are shear-stable. The thickening agents of the invention have good high-temperature, cloud-separation properties and can be used in comparatively small amounts to achieve the desired results.

The thickening agents used in accordance with the invention are water soluble organic polyalkyleneoxy addition products of ethylenediamine which contain a hydrophobic element consisting of a polyoxypropylene polymer chain constituting about 10 to 50% by weight of the compound, and a hydrophilic portion consisting of a polyoxyethylene polymer chain which constitutes about 90 to 40% by weight of the compound. The addition product is designated as N,N,N',N'-tetrakis[hydroxypoly(oxyethylene-oxypropylene)]ethylenediamine and may be represented by the following general formula:

(1) 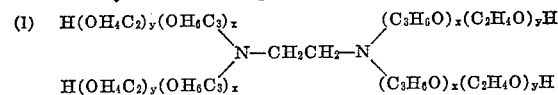

in which $x$ and $y$, respectively, are integers having a value of at least 8 and 100 whereby the molecular weight of the compound, based on the hydroxyl value, is at last 20,000, and are preferably such that the average molecular weight is within the range of 20,000 to 60,000 or higher, e.g., 100,000.

The compounds conforming to the above structure are known materials conventionally prepared by the sequential addition of propylene and ethylene oxides to ethylenediamine. The reaction is carried out in the presence of an acid or alkaline catalyst, e.g., sodium hydroxide, potassium hydroxide, by adding the alkylene oxide to ethylenediamine, which is preferably stirred and heated. If desired, the diamine compound can be dissolved in an inert solvent, e.g., toluene, benzene, dioxane, xylene, etc., and then reacted with the alkylene oxides. The reaction is carried out under atmospheric or superatmospheric pressure at temperatures of about 110 to 170° C. To the extent required, conventional heat transfer means can be used to remove the exothermic heat of reaction. The products of the reaction, after neutralization and filtering, are water-soluble addition products of ethylenediamine which contain four hydrophobic-hydrophilic chains.

The hydraulic fluids thickened according to the invention are fluid compositions identified as "Hydrolubes." As used herein, the term "Hydrolube" is a generic expression which refers to an aqueous fluid containing the polyoxyalkylene addition products noted in Formula I and a freezing point depressant consisting of one or more water soluble polyhydric alcohols or ethers.

Representative freezing point depressants include water soluble polyhydric alcohols such as propylene glycol, dipropylene glycol, polypropylene glycol, ethylene glycol, diethylene glycol, triethylene glycol, etc., and the polyhydric alcohol ethers such as the methyl, ethyl, propyl and butyl monoethers of ethylene glycol and diethylene glycol. The preferred compounds are polyhydric alcohols of 2 to 6 carbon atoms.

Preferred compositions prepared in accordance with the invention are hydraulic fluids which comprise about 30 to 70% by weight water and 15 to 50% by weight of a freezing point depressant consisting of a polyhydric alcohol. The polyoxyalkyleneoxy addition product of ethylenediamine is used in an amount sufficient to impart desired viscosity characteristics to the fluid ranging from a viscosity of 70 SUS to 1000 SUS at 100° F., and preferably a viscosity between 100 SUS and 300 SUS at 100° F. Within these viscosity limits the amount of thickening agent will vary of course depending upon the relative concentration of water and polyhydric alcohol. As a general guide, however, the thickening agent is used in amounts varying between 8 to 40% by weight, based on the total composition.

The invention also contemplates that various known additive agents may be incorporated in the hydraulic fluid for wear-resistance, lubricity, oxidative stability and corrosion protection in both the liquid and vapor phases.

Additive agents which are effective for preventing corrosion of the common metals used in hydraulic systems include alkaline materials such as the alkali metal hydroxides, e.g., potassium hydroxide, sodium hydroxide, etc.; alkaline and alkali metal borates, e.g., sodium tetraborate, calcium borate, potassium borate, etc.; alkali metal phosphates, phosphates and nitrites; amines such as morpholine, ethanolamine, triethanolamine, etc.; amine salts such as the mono- or dibutyl ammonium borates; amine nitrites, e.g., diisopropylammonium nitrite, and the like. The corrosion inhibitors are used in small amounts ranging from 0.01% to 5% by weight.

Other additives which may be used to enhance one or more desired characteristics include antioxidants such as phenyl-α-naphthylamine, phenyl-β-naphthylamine, 2,2-di-(4-hydroxyphenyl) propane, etc.; and organic inhibitors such as mercaptobenzothiazole and the alkali metal salts thereof, e.g., sodium mercaptobenzothiazole, etc.

Any suitable method can be employed in preparing the hydraulic fluid composition. The water and freezing point depressant can be added together or individually in any desired sequence. With additive agents, however, e.g., corrosion inhibitors, it is preferred to add the inhibitor as a solution in the freezing point depressant. It is also preferred to warm this solution during its preparation in order to facilitate dissolution. All components are mixed until a single phase composition is obtained.

The following examples illustrate the best mode now contemplated for carrying out the invention.

EXAMPLES 1 TO 5

Hydraulic base fluids were prepared which contained water, ethylene glycol, and minor amounts of common additive agents. The compositions thus formulated were thickened with commercially available materials, including the thickening agent of the invention, and evaluated for viscosity characteristics. Table I below shows the effect of the thickener type on the viscosity of the hydrolube formulation. In Example 4 the viscosity data illustrates that the polyalkyleneoxy addition products of ethylenediamine have a very efficient thickening action in that a lower concentration sufficed to give a higher viscosity than that obtained with other thickeners. In aqueous-based hydrolube formulations where relatively high viscosity is required, i.e., greater than 70 S.U.S. and preferably above about 130 S.U.S. at 100° F., it has been heretofore necessary to use conventional thickeners in concentrations of at least about 16 to 40% by weight. Example 4 illustrates that the thickeners of the invention are effective in relatively small amounts.

Table I

| Thickener | Composition¹ | 1 | 2 | 3 | 4 | 5 |
|---|---|---|---|---|---|---|
| A | Water | 62.0 | 62.0 | 62.0 | 62.0 | 62.0 |
|   | Ethylene Glycol | 25.0 | 25.0 | 25.0 | 25.0 | 16.0 |
| A | | 10.0 | 20.0 | | | |
| B | | | | 20.0 | | |
| C | | | | | 15.0 | |
| D | | | | | | 20.0 |
| Viscosity, S.U.S. at 100° F | | 55 | 142 | 100 | 158 | 137 |
| Cloud-Separation Temp., °F | | >230 | >230 | >230 | >230 | >180 |

A=Polyalkylene glycol copolymer of ethylene oxide and propylene oxide; 80–90% oxyethylene; average mol. wt. 13,500–15,000.
B=N,N,N',N'-tetrakis [hydroxypoly(oxyethylene-oxypropylene)]-ethylenediamine; average mol. wt. about 6000; 40–49% oxyethylene.
C=N,N,N',N'-tetrakis [hydroxypoly(oxyethylene-oxypropylene)]-ethylenediamine; average mol. wt. about 27,000; 80–89% oxyethylene.
D=Polyalkylene glycol copolymer of ethylene oxide and propylene oxide; average mol. wt. 8,000–12,000.
¹ Parts by weight.

Table II below illustrates the high shear stability exhibited by the hydraulic compositions of the invention. The formulated fluids contained minor amounts of conventional additives for wear resistance and corrosion protection, and were tested in a hydraulic bench system carried out in a Vickers Model V–104–Y vane pump operating at 1200 r.p.m. The fluid undergoing evaluation flows from a hopper-type reservoir into the inlet of the pump, through the pump to a pressure relief valve which serves as the loading device for the pump, through a calibrated flow-measuring orifice, heat exchanger, and back to the reservoir. Pressure gauges are installed at pump discharge as well as before and after the orifice. A thermocouple in the bottom of the reservoir measures the fluid temperature. Control of fluid temperature is accomplished by a Fenwal Thermoswitch in the low-pressure hydraulic fluid line which is used in conjunction with a solenoid valve in the water line to the heat exchanger. Table II shows data obtained when the hydraulic compositions were circulated at 1000 p.s.i. in the vane pump for 16 hours. Relative resistance to shearing is measured by the degree to which the hydraulic fluid retains its original viscosity.

Table II

| Composition¹ | 1 | 2 | 3 | 4 | 5 |
|---|---|---|---|---|---|
| Water | 58.6 | 66.0 | 66.0 | 66.0 | 62.1 |
| Ethylene Glycol | 24.0 | 16.0 | | | 20.0 |
| Propylene Glycol | | | 16.0 | 16.0 | |
| Thickener² | 14.0 | 14.6 | 14.6 | 14.6 | 14.5 |
| Fluid Properties: | | | | | |
| Original Viscosity, SUS at 100° F | 153 | 144 | 147 | 165 | 151 |
| Final Viscosity, SUS at 100° F | 156 | 148 | 152 | 182 | 164 |

¹ Parts by weight.
² N,N,N',N'-tetrakis [hydroxypoly(oxyethylene-oxypropylene)]-ethylenediamine; average molecular weight of approximately 27,000; oxyethylene content=80–89%.

What is claimed is:

1. A hydraulic fluid composition consisting essentially of from about 30 to 70% by weight water, about 15 to 50% by weight of a freezing point depressant selected from the group consisting of water soluble polyhydric alcohols and polyhydric ethers and from 8 to 40% by weight of a water soluble organic thickener having the formula:

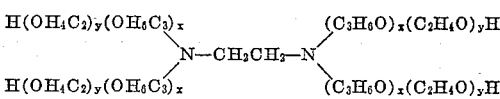

wherein $x$ and $y$, respectively, are integers having a value of at least 8 and 100 whereby the average molecular weight of the compound is at least 20,000 with the oxypropylene groups constituting about 10 to 50% and the oxyethylene groups about 90 to 40%, by weight, of the compound.

2. The hydraulic fluid composition of claim 1 wherein the freezing point depressant is ethylene glycol.

3. The hydraulic fluid composition of claim 2 wherein the molecular weight of the thickener is from about 20,000 to 100,000.

No references cited.